May 22, 1951 H. F. COOK ET AL 2,553,959
FIFTH WHEEL CONSTRUCTION
Filed July 23, 1947 3 Sheets-Sheet 1
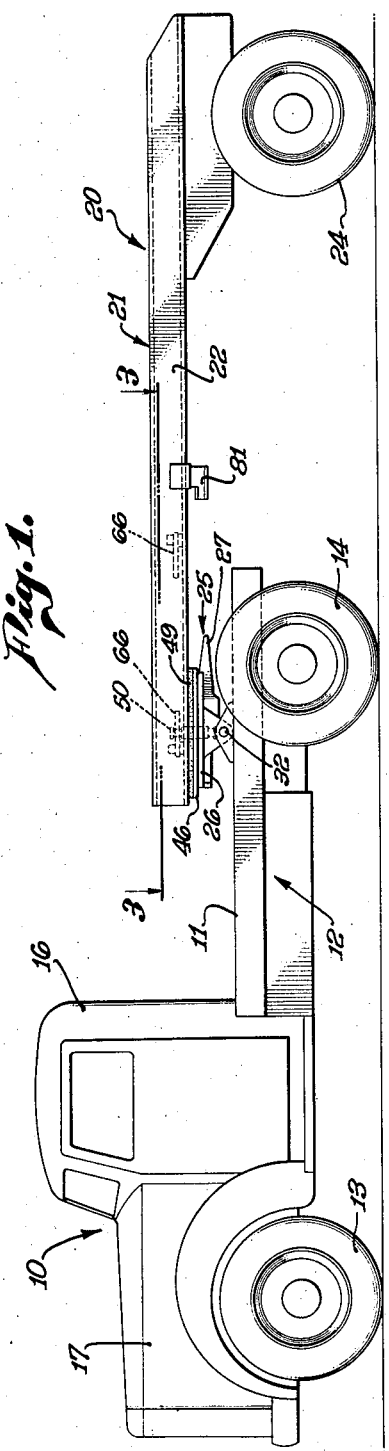
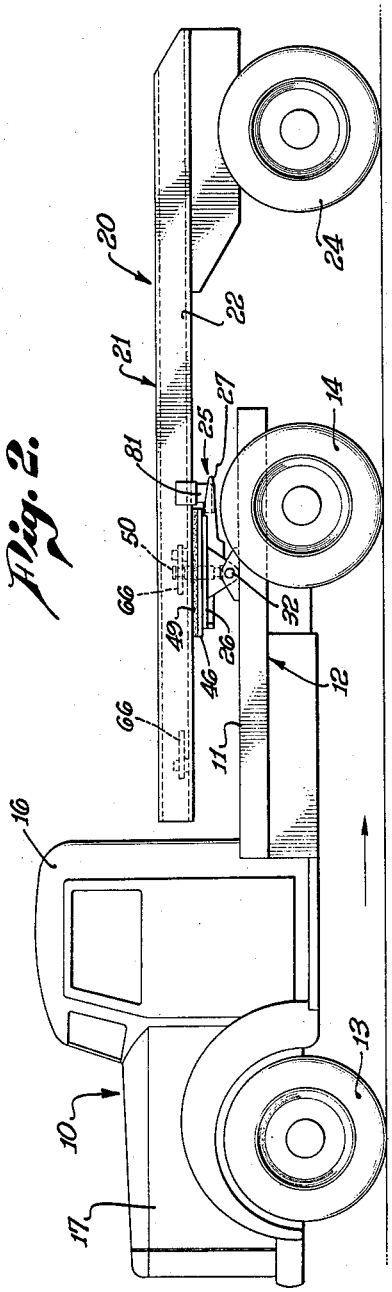
INVENTORS
HOWARD F. COOK
HENRY C. HARBERS
BY
ATTORNEY

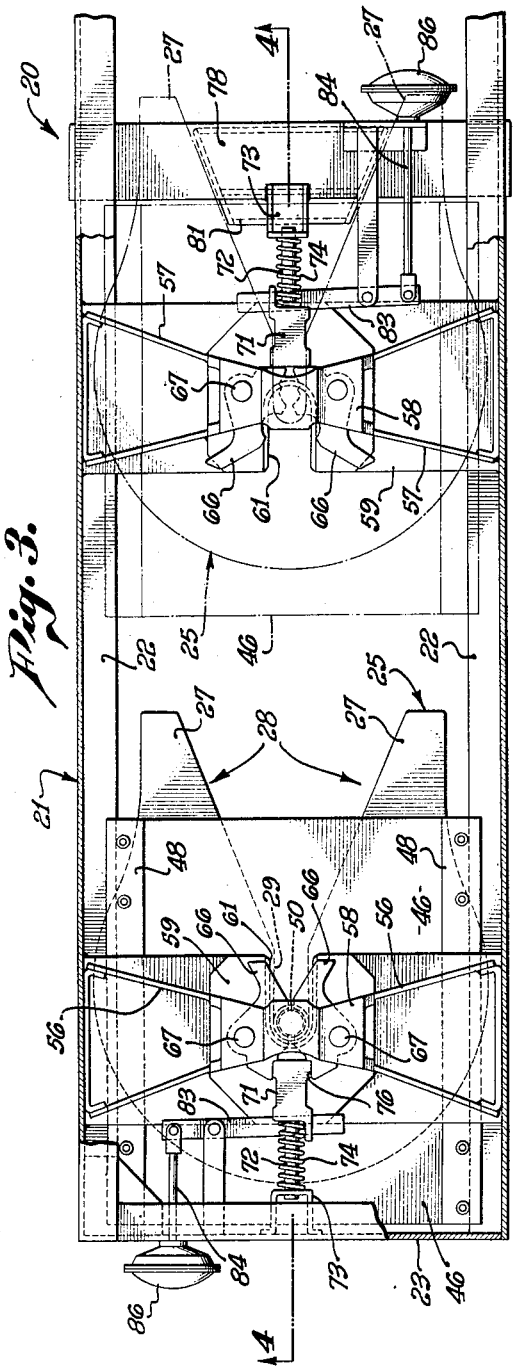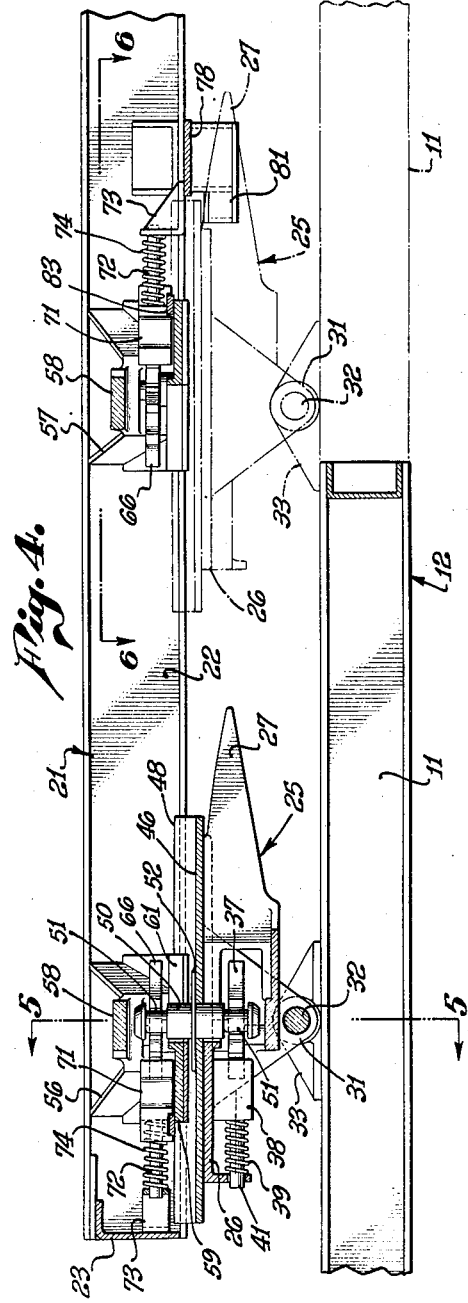

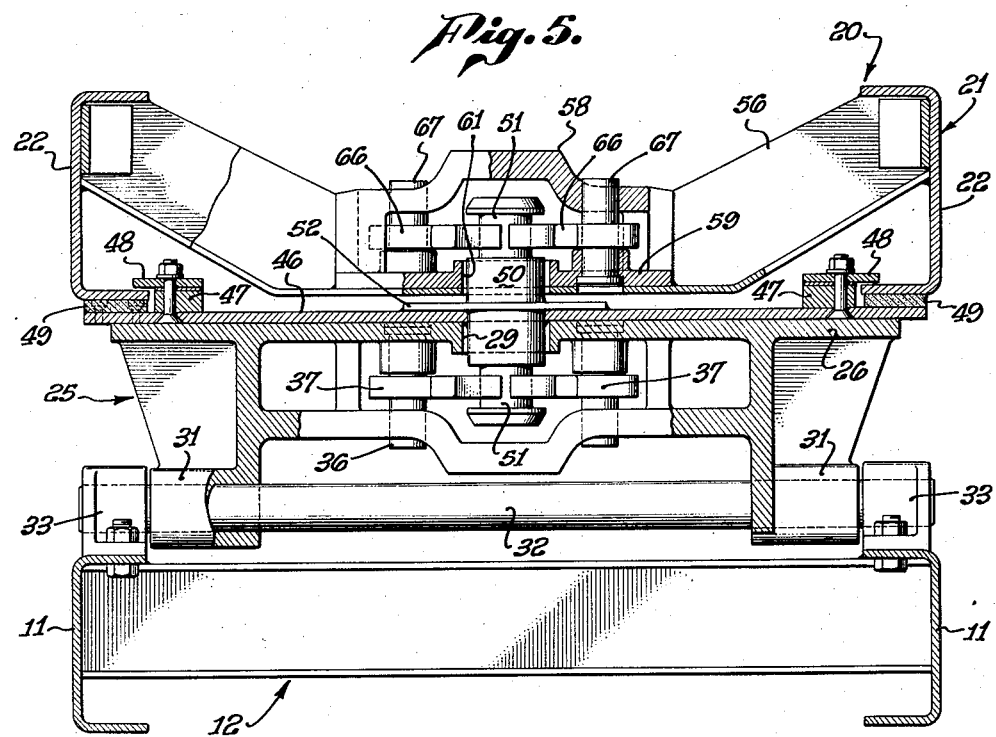
Fig. 5.
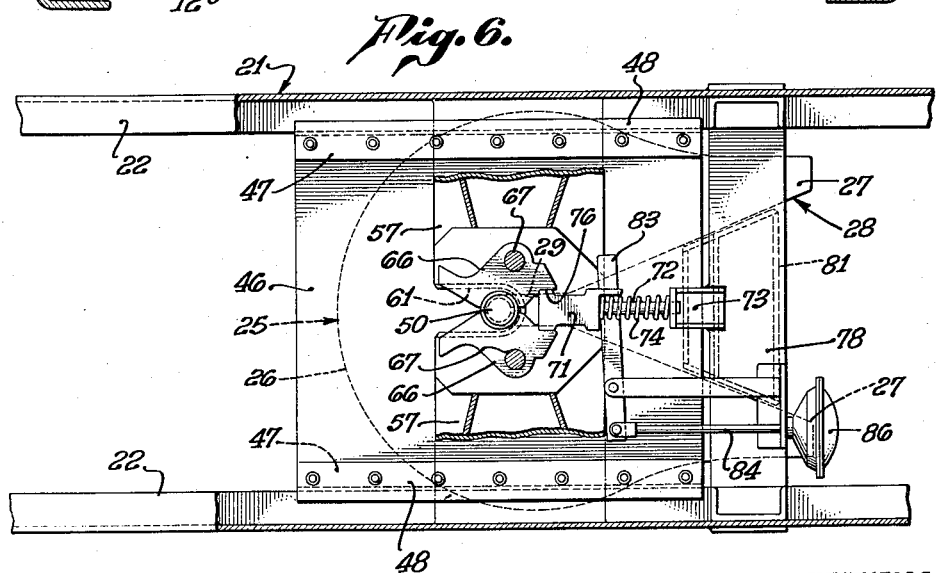
Fig. 6.
INVENTORS
HOWARD F. COOK
HENRY C. HARBERS
BY
ATTORNEY Patented May 22, 1951

2,553,959

UNITED STATES PATENT OFFICE 2,553,959

FIFTH WHEEL CONSTRUCTION

Howard F. Cook, Pasadena, and Henry C. Harbers, San Gabriel, Calif., assignors to Cook Bros. Equipment Co., a corporation of California Application July 23, 1947, Serial No. 763,114

13 Claims. (Cl. 280—33.05)

The present invention relates to fifth wheel constructions and to a tractor semi-trailer combination connected thereby, the principal object being the provision of a new and improved fifth wheel construction incorporating inherent advantages over fifth wheel constructions heretofore known and used.

It is an object of the present invention to provide a new and improved fifth wheel construction.

It is another object of the invention to provide a new and improved fifth wheel construction by which a semi-trailer may be connected at a plurality of spaced points to a pulling tractor.

Still another object of the invention is to provide an improved fifth wheel construction for tractors and semi-trailers by which the semi-trailer may be connected pivotally to the tractor in one position and rigidly thereto in a second longitudinally spaced position.

Another object of the invention is to provide a fifth wheel construction which permits the tractor to be connected to the semi-trailer at different distances from its center of gravity in order that the load carried by the rear wheels of the tractor can be varied.

Still another object of the invention is to provide a fifth wheel construction in which the king pin is adjustably carried by the frame of the semi-trailer.

These and other more specific objects will appear upon reading the following specification and claims and upon considering in connection therewith the attached drawings to which they relate.

Referring now to the drawings in which preferred embodiments of the present invention are disclosed:

Figure 1 is a side elevational view of a tractor semi-trailer combination connected by a fifth wheel construction embodying the principles of the present invention and adapted for ordinary highway travel;

Figure 2 is a view similar to Figure 1 but with the semi-trailer shifted to a short-coupled relationship to tractor and rigidly connected thereto;

Figure 3 is a partial longitudinal section looking down upon the line 3—3 of Figure 1 and shows the two operative positions at which the fifth wheel construction functions to connect the trailer and tractor;

Figure 4 is a vertical longitudinal section upon the line 4—4 of Figure 3;

Figure 5 is a transverse vertical section upon the line 5—5 of Figure 4;

Figure 6 is a view looking downwardly from the line 6—6 of Figure 4 and shows the fifth wheel construction with the tractor and semi-trailer in their rigidly locked relationship.

Fifth wheels of the type commonly used for connecting tractors to semi-trailers comprise a relatively large plate-like member or platform formed preferably with a V-shaped opening or slot in its rear side, which slot extends approximately to the center thereof where suitable latch means are provided to engage releasably a king pin carried by the trailer. The plate-like member or platform is conventionally mounted for limited pivotal or tipping movement about a horizontal axis on the tractor frame for the purpose of aiding the connection of the tractor and semi-trailer despite variations in height. With the king pin locked in its seat in the fifth wheel relative rotation is permitted in order that the semi-trailer and the tractor can pivot relative to each other about the king pin.

For ordinary highway travel the pivotal connection between the tractor and semi-trailer through the fifth wheel and king pin is entirely satisfactory but it has been found that when the vehicle leaves the highway, as in traveling through sand and gravel and other material rendering movement difficult, it is advantageous to have the semi-trailer rigidly connected to the tractor, particularly in backing. Additionally, as the fifth wheel connection is positioned at the forward end of the semi-trailer it has also been determined that if the point of connection is moved rearwardly relative to the center of gravity of the trailer the rear wheels of the tractor will carry a larger part of the trailer weight and so have greater traction with the ground.

With an appreciation of the defects and disadvantages of the prior art devices the fifth wheel construction comprising the present invention is designed to permit the tractor to move rearwardly relative to the trailer after being connected thereto so that when desired a larger proportion of the trailer weight can be shifted to the rear wheels of the tractor. Additionally, means are provided so that in the shifted position the trailer is rigidly connected to the tractor.

Referring again to the drawings, a conventional motor vehicle of the tractor type is illustrated generally at 10, and includes a rigid frame 12 comprising side members 11. The frame is supported at its forward end by ground wheels 13 which are adapted to be turned for steering purposes. The rear of the tractor frame 12 is carried by wheels 14 through which the propelling force of the tractor motor is directed. The tractor preferably includes a conventional cab 16 housing the usual controls for the vehicle, and an unshown driving motor is positioned under the hood 17.

A semi-trailer, indicated generally by the reference character 20, comprises a rigid frame 21 formed of inwardly facing U-sectioned channel members 22 suitably spaced rigidly in parallelism by means including a forward end member 23. Trailer frame 21 is supported at its rear by wheels 24 in a conventional manner and may be provided forwardly thereof with suitable means, such as folding legs common in the art, in order to be self-supporting when not connected to the tractor.

The fifth wheel proper is carried by the tractor frame 11 and is indicated generally by the reference character 25. It is seen to comprise a circular plate-like member or platform 26, having a flat top and a pair of rearwardly extending laterally spaced, diverging extensions 27, the extremities of which curve downwardly, as is illustrated clearly in Figure 4. These extensions 27 define a converging V-shaped slot 28 which narrows into a relatively narrow parallel-sided slot 29. Fifth wheel 25 is mounted for pivotal movement by integral sleeve bearings 31 upon a transverse horizontal shaft 32 carried in supports 33 upon the upper edge of each side member 11 of frame 12. A pair of swingable jaws 37 with rearward diverging extremities are centrally pivoted upon vertical pins 36 on wheel 25 and below its flat surface 26. These jaws are substantially identical to similar jaws mounted upon the semi-trailer hereinafter to be described more fully, and at this point it is adequate to state that their function is to retain the lower end of a king pin carried by the semi-trailer. The jaws are adapted to be locked in closed pin-retaining relationship by a block element 38 normally forced into locking position by coil spring 39. The block is slidable with an integral shaft 41 extended through the downturned forward edge of the plate 26. As in the case of the other locking jaws, means are provided to displace the block to an inoperative position so that the jaws may open to permit the king pin to be displaced.

Referring now to the cooperating elements carried by the semi-trailer adapted to cooperate with the fifth wheel in connecting it to the tractor, a slidable platform 46 is provided which extends between the side frame members 22, being slidable upon the lower inturned sides thereof by virtue of the presence of guide members 47, each of which includes an upper metallic plate 48 overhanging the top surface of the frame's adjacent lower edge. As the weight of the forward portion of the semi-trailer will rest upon the platform 46, and to enable that member to be moved between spaced positions relative to the trailer with a minimum of frictional resistance, suitable liners 49 are positioned between the upper surface of plate 46 and the frame members.

The king pin, indicated generally by the reference character 50, is formed with upper and lower reduced portions 51, and midway between its ends with an integral laterally extending plate 52 permanently secured, as by welding, to platform 46. The lower reduced portion 51 of the king pin is positioned below the platform 46, with the latter resting upon the fifth wheel plate 26, and is adapted to move into and between and to be clamped by the jaws 37 of the fifth wheel 25.

Transversely extending jaw-carrying supports 56 and 57 extend between the side member 22 of the trailer frame, support 56 being positioned near the forward end of the frame, while support 57 is positioned rearwardly thereof and nearer to the longitudinal middle of the frame. Supports 56 and 57 are substantially identical, each comprising transverse side webs converging centrally and connected top and bottom by plates 58 and 59, respectively. Lower plate 59 in each transverse support is slotted at 61, the slot having a width sufficient to receive the central portion of the king pin 50, the slots in the two supports opening toward each other. A pair of pin-clamping jaws 66 are pivotally mounted upon vertical pins 67 extended between and carried by plates 58 and 59, the jaws being substantially identical to the jaws 37 referred to in connection with the fifth wheel 25, and contoured as to provide centrally locking seats for the upper reduced portion 51 of king pin 50 and their faces form opposed converging entrance ways to these seats. The relationship is such that the movement of the pin between a pair of jaws can function to cam them apart so that the pin can enter its seat. The contact of a pin with the inner faces of a seat forces the jaws together and closes the entrance way, the seating relationship being illustrated in the left hand portion of Figure 3.

To retain each pair of jaws in their closed and pin-locking relationship a block element 71 is provided corresponding to the block element 38 previously referred to in connection with the jaws 37. Each element 71 is connected to a shaft 72 slidably mounted in a bracket 73 fixed, in the case of forward support 56, to the end member 23 of trailer frame. A coil spring 74 at all times urges each block element 71 toward the adjacent jaws which, on their adjacent sides, are provided with cut-out portions forming a seat to receive it when the jaws are closed. When in its seat 76 a block 71 prevents the adjacent jaws 66 from moving and thereby prevents their opening to permit the escape of the king pin. The position of a pair of jaws 66 in their pin-locking relationship is illustrated in the left hand portion of Figure 3, while in the right hand portion of the same figure the jaws of the rear support 57 are illustrated in open pin-receiving position. It is to be noted that with the jaws so spread the locking element 71 makes contact with the adjacent rear faces thereof to hold them in open position.

In the case of the jaws carried by support 57 the bracket 73 is carried by a transverse frame member 78. Frame member 78 performs the additional function of carrying a frustro-conical block 81 contoured as to fit the diverging slot 28 between the rearwardly extending portions 27 of the fifth wheel 25, and when positioned therebetween prevents angular displacement of the fifth wheel relative to the trailer body 21.

It is necessary that means be provided selectively to release the jaws 66 which at any given time are functioning to secure the king pin 50. Similar means are provided to release the jaws 37. This may be accomplished in any conventional manner, electrically, hydraulically or manually, and suitable means are illustrated as comprising a pivoted lever 83 connected to a plunger 84 of an hydraulically actuated cylinder 86. Normally, under the pressure exerted by the coil springs 74 in the case of jaws 66, and under the pressure of the spring 39 in the case of fifth wheel jaws 37, the block elements are forced against the rear of the adjacent jaws, either in position as to hold the jaws locked closed, as illustrated in the left hand portion of Figure 3, or to hold them open to receive the king pin, as illustrated in the right hand portion of that figure. To permit a pair of jaws 66 to open from their closed position, however, it is necessary that the locking block be withdrawn from its locking position in its seat 76. Such movement is accomplished under the actuation of the pivoted arm 83 which is connected to the locking element 71, being itself actuated by the hydraulic means described.

The operation of the apparatus constructed in accordance with the present invention is believed to be clear. Let it be assumed that the semi-trailer and tractor are as illustrated in Figure 1, in which relationship they would normally be traveling upon the highway, and a suitable load could be positioned upon the trailer frame 21 if desired. Relative pivotal movement can take place between the trailer and the tractor about the king pin 50 as an axis. The king pin is carried fixedly by the platform 46 upon the underside of the trailer frame and any pivotal movement results in the upper flat-surfaced plate of the fifth wheel 25 rotating about the king pin 50 as an axis, the plate sliding during each movement against the flat platform 46 through which it supports the weight of the forward part of the semi-trailer. In this, the normal hauling relationship, the platform 46 is positioned forwardly upon the trailer body and the king pin 50 is secured between the locking jaws 66 carried by the transverse support 56.

It is of course to be understood that the trailer and tractor were initially connected in the usual manner, the tractor backing under the forward end of the trailer so that the diverging extensions 27 of the fifth wheel 25 could direct the king pin 50 between the open clamping jaws 37 which were thereupon automatically closed by the pin into locking relationship, as previously described.

So long as the tractor semi-trailer unit operates upon the highway the relationship illustrated in Figure 1 is preferred. Upon leaving the highway and entering deep dirt or soft sand, however, or upon backing, the rear wheels 14 of the tractor should be moved rearwardly relative to the trailer frame so as to assume a larger proportion of the weight. This is accomplished first by actuating the block 71 related to the jaws of front support 56 to move it from its jaw-locking position shown in the left hand portion of Figure 3. The rearward movement of the tractor then causes the pin 50 to move rearwardly through and between the jaws 66 which are forced into their open position. King pin 50, being connected to the platform 46, carries the latter rearwardly with it under the moving force received from the fifth wheel 25. The guides 47 at the sides of platform 46 move along the lower edges of the trailer side members 22, the relative rearward movement of the platform continuing until the pin enters the slot 61 in the support 57 where it effects the closing of the adjacent jaws 66. This closing movement of the jaws temporarily displaces the block 71 rearwardly from the position shown in the right of Figure 3 until the jaws have moved into completely closed position, as illustrated in the left hand portion of the same figure, at which time spring 74 forces the locking element 71 into its jaw-locking position in its seat 76, that is, as illustrated in Figure 6. As the king pin 50 enters the jaws 66 of support 57 the rigid frustro conical block 81 simultaneously enters the slot 28 formed by diverging arms 27 of the fifth wheel to establish the relationship being illustrated clearly in Figure 6. The fifth wheel 25 is then locked with respect to the trailer frame and relative turning between the tractor and the semi-trailer is prevented.

In this second and locked position of the fifth wheel relative to the trailer the rear wheels of the tractor are rearwardly of their former position. This is evident from a comparison of Figures 1 and 2. The distance which separates the forward and rearward jaws 66 carried by the trailer is the measure of the change in position of the wheels 14. In this rearward position the rear wheels 14 are nearer the physical center and the center of gravity of the trailer and so assume a greater proportion of the load carried thereby.

To reestablish the original relationship requires the energization of the lever arm 83 controlling the block element 71 effecting the locking of the jaws 66 carried by support 57. The displacing of that block permits jaws 66 to open and the forward movement of the tractor effects the forward travel of the pin and its connected platform 46 relative to the trailer frame. Continued movement of the tractor forwardly places the king pin between the forward jaws on the trailer where it is again locked, the position being that illustrated in the left hand portion of Figure 3 and in Figure 1.

While the particular apparatus herein shown and described in detail is fully capable of attaining the objects and providing the advantages hereinbefore stated, it is to be understood that it is merely illustrative of the presently preferred embodiments of the invention and that no limitations are intended as to the details of construction or design herein shown other than as defined in the appended claims.

We claim:

1. In a tractor semi-trailer combination of the type in which a fifth wheel is mounted between the side frame members of a tractor and is formed with a diverging rearwardly directed slot adapted to receive a king pin carried by the frame of a semi-trailer and to support rotatably a carrying plate on said semi-trailer, a king pin unit comprising a king pin and a carrying plate, means to mount said unit on the frame of said semi-trailer for longitudinal sliding movement, spaced securing means on said semi-trailer frame adapted to engage and to secure said king pin unit at spaced points on said semi-trailer frame, and a fixed block on said frame arranged to engage the diverging slot of said fifth wheel to prevent relative rotation between said wheel and said semi-trailer frame.

2. In a structure of the class including a tractor and a semi-trailer adapted to be connected together by a king-pin, the combination of: means on said tractor for supporting the front end of said semi-trailer; a pair of connection stations including king-pin grasping means for seizing the upper portion of the king-pin disposed in longitudinally spaced locations of said semi-trailer, the one location lying relatively close to the forward end of the semi-trailer and the other location lying a relatively great distance rearwardly of said end; and grasping means disposed in said supporting means for grasping the lower portion of the king-pin; whereby the semi-trailer may be connected long-coupled fashion to the tractor at the first-said point thereby to enable the structure to negotiate sharp turns and whereby the semi-trailer may be connected short-coupled fashion to the tractor at the second-said point thereby to enable the structure to negotiate low-traction ground and to enhance control in backing up.

3. In a tractor semi-trailer combination, a fifth wheel mounted between the side frame members of the tractor and formed with a rearwardly diverging slot, a king-pin unit, comprising: a king-pin and a carrying plate therefor adapted to be supported by said fifth wheel; means for mounting said unit on the frame of said semi-trailer for longitudinal sliding movement; a plurality of securing means positioned on said semi-trailer in longitudinally spaced locations adapted to engage and secure said king-pin unit in pivotal condition at spaced points on said semi-trailer frame; and a lug carried by said frame in a position to engage in said diverging slot to prevent relative rotation between said wheel and said semi-trailer frame.

4. In a structure of the class including a tractor and a semi-trailer: a fifth wheel fixedly mounted longitudinally on the rear portion of the tractor; a connection between the semi-trailer and the fifth wheel affording movement of the fifth wheel longitudinally on the semi-trailer in response to movement of the tractor longitudinally relative to the semi-trailer, to occupy forward and rear positions thereon; and two latch means spaced longitudinally on the semi-trailer for securing the fifth wheel in either of said positions.

5. In a structure of the class including a tractor and a semi-trailer: a fifth wheel fixedly mounted longitudinally on the rear portion of the tractor; a connection between the semi-trailer and the fifth wheel affording movement of the fifth wheel longitudinally on the semi-trailer in response to movement of the tractor longitudinally relative to the semi-trailer, to occupy forward and rear positions thereon; two latch means spaced longitudinally on the semi-trailer for securing the fifth wheel in either of said positions; and coacting means on the fifth wheel and the semi-trailer for preventing relative rotation between said wheel and the semi-trailer when said wheel is in the rear position.

6. In a structure of the class including a tractor and a semi-trailer: a fifth wheel fixedly mounted longitudinally on the rear portion of the tractor and including a king pin; a connection between the semi-trailer and said wheel by which said wheel can be moved longitudinally on the semi-trailer to occupy forward and rear positions thereon in response to movement of the tractor longitudinally relative to the semi-trailer; and two king pin engaging means located forwardly and rearwardly respectively on the semi-trailer for releasably receiving said wheel in either of said positions.

7. In a structure of the class including a tractor and a semi-trailer: a fifth wheel fixedly mounted longitudinally on the rear portion of the tractor and including a king pin; a connection between the semi-trailer and said wheel by which said wheel can be moved longitudinally on the semi-trailer to occupy forward and rear positions thereon in response to movement of the tractor longitudinally relative to the semi-trailer; two king pin engaging means located forwardly and rearwardly respectively on the semi-trailer for releasably receiving said wheel in either of said positions; and coacting means on said wheel and the semi-trailer for preventing a relative rotation between said wheel and the semi-trailer when said wheel is in the rear position.

8. The structure recited in claim 4 characterized in that said latch means are confrontingly arranged and automatically operable to latch said wheel in either of said positions in response to longitudinal movement of the tractor in one direction or the other relative to the semi-trailer.

9. The structure recited in claim 8 characterized in that means is provided on the semi-trailer and said wheel coacting under movement of said wheel to the rear position to lock said wheel and the semi-trailer against rotation relatively.

10. In a tractor and semi-trailer combination of the type in which the front end of the frame of the semi-trailer overlies the rear of the frame of the tractor, means for tractively connecting said tractor and semi-trailer and for transmitting the load of the forward end of the semi-trailer to the rear end of the tractor, comprising: a fifth wheel carried by the frame of said tractor, a king pin slidably mounted on the frame of said semi-trailer, locking means on said tractor to lock said king pin releasably to said fifth wheel, spaced locking means on said trailer frame to lock said king pin at spaced points on said semi-trailer frame to vary the weight transmitted to said tractor; and means provided on said semi-trailer frame to engage said wheel to prevent turning in one of two positions of said pin on the semi-trailer frame.

11. The structure recited in claim 10 characterized in that said one position is the rearmost position which said pin can assume on the semi-trailer frame.

12. The structure recited in claim 10 characterized in that individual means is provided for actuating said locking means whereby they may be selectively released to permit said pin to be shifted between positions on the semi-trailer or to be released from said wheel in all positions.

13. The structure recited in claim 6, wherein releasable means is provided on the tractor engagable with the king pin for locking the latter to said wheel.

HOWARD F. COOK.
HENRY C. HARBERS.

REFERENCES CITED

The following references are of record in the file of this patent:

UNITED STATES PATENTS

| Number | Name | Date |
|---|---|---|
| 974,877 | Greene | Nov. 8, 1910 |
| 1,400,752 | Land | Dec. 20, 1921 |
| 1,450,554 | Kreissle | Apr. 3, 1923 |
| 2,077,484 | King | Apr. 20, 1937 |
| 2,194,160 | Brewster | Mar. 19, 1940 |
| 2,197,401 | Weber | Apr. 16, 1940 |
| 2,317,508 | Zoder | Apr. 27, 1943 |